(12) United States Patent
Lee et al.

(10) Patent No.: US 7,035,919 B1
(45) Date of Patent: Apr. 25, 2006

(54) METHOD FOR CALCULATING USER WEIGHTS FOR THIN CLIENT SIZING TOOL

(75) Inventors: Sharon Marie Lee, Mission Viejo, CA (US); Leonard Eugene Eismann, Rancho Santa Margarita, CA (US); Kathryn Ann McDonald, Yorba Linda, CA (US)

(73) Assignee: Unisys Corporation, Blue Bell, PA (US)

( * ) Notice: Subject to any disclaimer, the term of this patent is extended or adjusted under 35 U.S.C. 154(b) by 847 days.

(21) Appl. No.: 09/813,668

(22) Filed: Mar. 21, 2001

(51) Int. Cl.
*G06F 15/173* (2006.01)
(52) U.S. Cl. ................... 709/223; 709/203
(58) Field of Classification Search ........ 709/200–226, 709/238; 718/100–105, 106, 107; 719/310–318; 707/10, 103 R, 102; 715/744; 726/29, 12; 702/101, 102; 700/240; 711/168; 712/9
See application file for complete search history.

(56) References Cited

U.S. PATENT DOCUMENTS

| | | | |
|---|---|---|---|
| 6,327,622 B1* | 12/2001 | Jindal et al. ................. | 709/228 |
| 6,496,948 B1* | 12/2002 | Smorodinsky ............... | 714/37 |
| 6,567,767 B1* | 5/2003 | Mackey et al. ............. | 702/186 |
| 6,571,283 B1* | 5/2003 | Smorodinsky .............. | 709/220 |
| 6,687,735 B1* | 2/2004 | Logston et al. ............. | 709/203 |
| 6,691,259 B1* | 2/2004 | Mackey et al. ................ | 714/46 |
| 2002/0002613 A1* | 1/2002 | Freeman et al. | |
| 2002/0116605 A1* | 8/2002 | Berg | |

* cited by examiner

*Primary Examiner*—John Follansbee
*Assistant Examiner*—Haresh Patel
(74) *Attorney, Agent, or Firm*—Alfred W. Kozak; Mark T. Starr; Lise A. Rode

(57) ABSTRACT

A Thin Client Sizer, used to configure an optimal Server Farm, requires specific data regarding the category level of utilization, by each User, of each of the Applications available to the Server Farm. A method is presented for input to a Solution Configurator to select and categorize each User-Type User as to add in his utilization of each Application used in the Server Farm.

2 Claims, 4 Drawing Sheets

METHOD FOR CALCULATING USER WEIGHTS FOR THIN CLIENT SIZING TOOL

FIELD OF THE INVENTION

This disclosure involves a method for calculating user weights for use during the solution generation and configuration process for an enterprise which uses a Thin Client Sizing Tool to propose an optimal configuration of Server Farms.

CROSS-REFERENCES TO RELATED APPLICATIONS

This application is related to co-pending applications designated hereinbelow and which are all included herein by reference.

U.S. Ser. No. 09/813,667 now abandoned entitled "THIN CLIENT SIZING TOOL FOR ENTERPRISE SERVER FARM SOLUTION CONFIGURATOR";

U.S. Ser. No. 09/813,671 entitled "CONFIGURATION INTERVIEW SESSION METHOD FOR THIN CLIENT SIZING TOOL";

U.S. Ser. No. 09/813,672 entitled "METAFARM SIZER CONFIGURATION OPTIMIZATION METHOD";

U.S. Ser. No. 09/813,670 entitled "SOLUTION GENERATION METHOD FOR THIN CLIENT SIZING TOOL";

U.S. Ser. No. 09/813,669 entitled "METHOD FOR CALCULATING MEMORY REQUIREMENTS FOR THIN CLIENT SIZING TOOL";

U.S. Pat. No. 6,496,948 entitled "METHOD FOR ESTIMATING THE AVAILABILITY OF AN OPERATING SERVER FARM";

U.S. Pat. No. 6,571,283 entitled "METHOD FOR SERVER FARM CONFIGURATION OPTIMIZATION";

U.S. Ser. No. 09/705,441 now U.S. Pat. No. 6,859,929 entitled "METHOD FOR SERVER METAFARM CONFIGURATION OPTIMIZATION".

BACKGROUND OF THE INVENTION

Of special importance to newly developing enterprises which have multiple users at several different sites, many different types of problem situations are presented to the designer, the proposal-maker, and configurator of Server Farm facilities.

Part of this solution is the need to establish and utilize the "user-weights" involved according to the data in the Customer Profile which was developed in connection with U.S. Ser. No. 09/813,671 now abandoned.

In order for a designer or developer to provide a solution configuration for a customer having many users or an enterprise with multiple numbers of client-user terminals involved, there must be concluded a calculation as to the appropriate number and type of servers that would be required as per the configuration development in U.S. Ser. No. 09/813,672 now U.S. Pat. No. 6,963,828 and Ser. No. 09/813,670. Part of that design and development work for an appropriate proposal involves calculating the weight (stress) of users relative to a typical benchmark user for the Thin Client Sizing Tool.

Often neglected and seldom investigated data, in the prior art methods of estimation and configuration of Server Farms for enterprises, was the area of "user weights" which involves the types of users who use the various application programs in a system. These can now be identified in terms of light, medium, heavy and super-heavy users. As a result, these factors can now be taken into the development of algorithms which will help provide the most appropriate solution for a given enterprise or group of users.

One area of specific development which had often been ignored or unknown, in past estimations, was that of determining the level of stress, the speed or the quality and quantity of usage involved by the different types of personnel who are denoted as "user-types". Then by taking into consideration the different types of applications involved with each user-type as they impact on overall network operations, this information could then be factored in.

As a result, the presently-described method for calculating the user weights in the Thin Client Sizing Tool operation can now be done to eliminate much of the guesswork and to help develop a more accurate configuration solution.

SUMMARY OF THE INVENTION

The present invention provides a tool for providing service for an enterprise with an algorithm utilizing a method for determining the particular level of stress involved with different user-types of user personnel, in addition to correlating the types of applications and servers that these user-types are involved with. Then, this can be used to estimate an adjusted number of users in a Server Farm that correlates more closely to the average or typical benchmark user for each specific Server.

Thus, by taking into account the number of typical users and the number of different stress levels, such as light, medium, heavy, and super-heavy, involved for the applications used, these stress levels can be used to help determine a proposed solution configuration for a potential Thin Client customer of an enterprise.

The presently-described method is used to provide a means for assessing the stress of processor use, as the processor use is imposed upon by the different types of users and the different types of applications involved by the user on each particular server. The algorithm introduces the concept of rating different application attributes and putting them in generic categories to aid in the final development of proposing an optimal configuration sizing of Servers for the enterprise.

GLOSSARY LIST OF RELEVANT ITEMS

Figure 1:
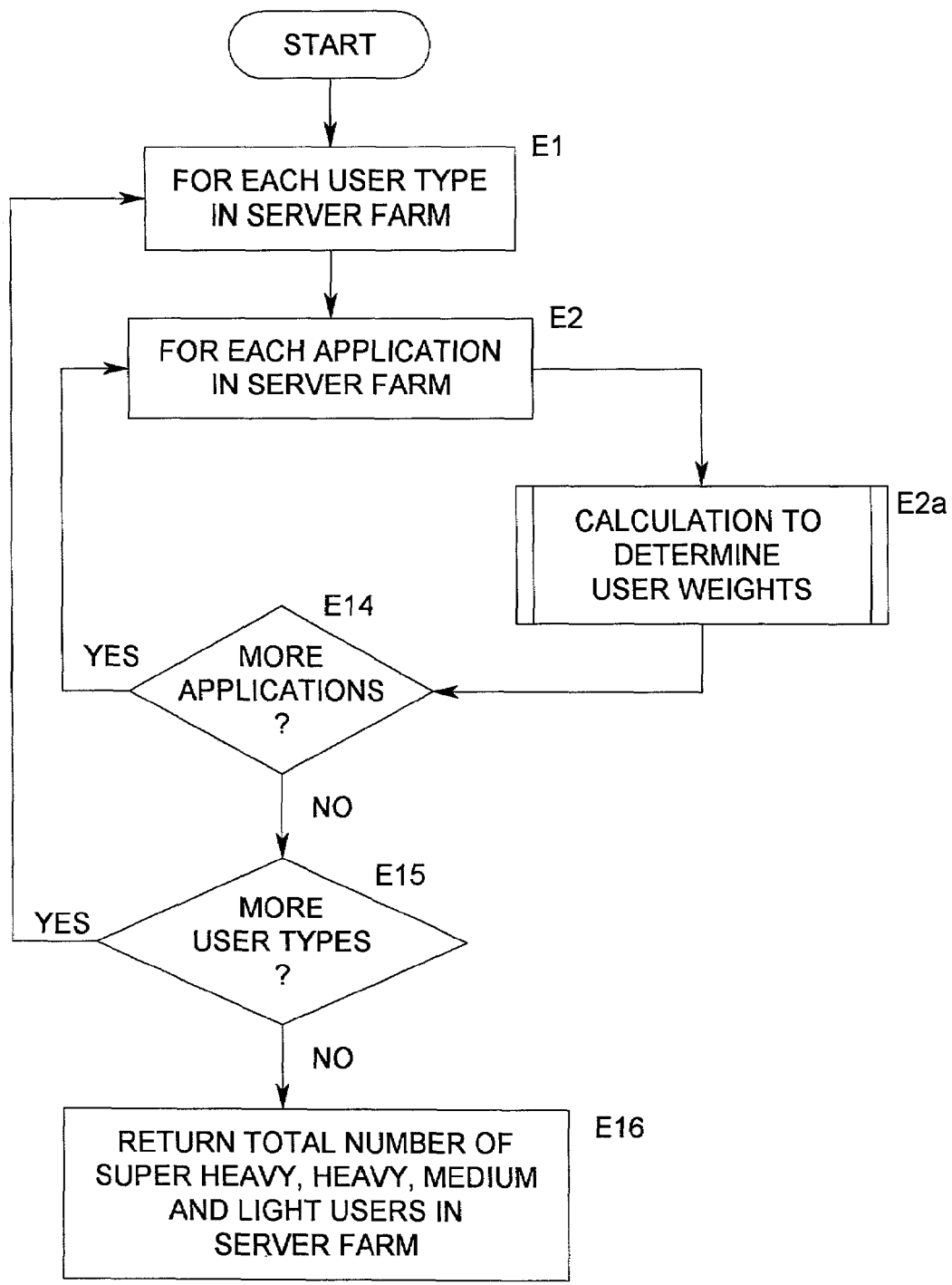
FIGS. 1, 2A and 2B show flowcharts illustrating the various steps involved in calculating the user weights for the Thin Client Sizing Tool.

1. ADJUSTED USER TOTAL (SERVER FARM): The normalized total number of Users that will be supported by the SERVER FARM. Unadjusted Users are grouped into 4 distinct usage-pattern categories, namely (a) Light, (b) Medium, (c) Heavy, and (d) Super Heavy. Calculations are performed on the number of Users in each grouping to determine the normalized number of Users. These normalized numbers are then summed to establish the ADJUSTED USER TOTAL for the entire SERVER FARM.
2. APPLICATION DELIVERY SOLUTION CONFIGURATOR: This is the Unisys approved and recognized designation of the present method and system as defined by this invention. This is a Windows application that helps one in choosing the best-developed Application Delivery (Thin Client) server solution that will meet a client's requirements. This Solution Configurator guides one through a customer interview session where information is gathered in order to develop a set of solutions that will match the customer's performance requirements but also provide different availability levels suitable to the customer-client.

3. APPLICATION SERVER: This is the intended use or responsibility of one of the designated server farms. This type of server farm would run computer programs or pieces of software designed to perform specific multi-user tasks solely within the Windows Terminal Server systems making up the server farm. APPLICATION SERVERS would not be dependent on other back-end servers for the processing of data.

4. APPLICATION TYPE: This is one of four main interview categories used by the described Thin Client Sizer Tool for collecting customer information and collecting also Application Type documents involving the memory and the disk resources typically required when running an application. Supplying the Application Types that will be running helps to size the Server Farm in order to sufficiently handle the client demand.

5. APPINPUT: GUI-based—This requires limited User input such as an application developed with Microsoft Visual Basic where selections are made from lists or by clicking various options. Text-based—Requires considerable typing by the User such as creating a document in Microsoft Word.

6. APPOUTPUT: Text-based—Indicates the kind of information presented by the application. For example, most Visual Basic or C++ windows and dialog boxes, most uses of productivity apps (Microsoft Office), terminal emulation, etc. Graphic-based—Indicates the kind of information presented by the application. For example, desktop publishing large documents with graphics, Web pages with a lot of picture content (JPEG files), scanned images (TIF files), Microsoft Encarta, etc.

7. APPPROCESSING: Light—Indicates the application executing on the terminal server does little more than present a GUI. For example, a Visual Basic application, the SAP thin client, light use of productivity apps (Microsoft Office), terminal emulation, etc. Heavy—Indicates the application executing on the terminal server uses more processor, memory or disk resource usage. For example, the PeopleSoft Thin Client, Outlook Exchange client, heavy use of productivity apps for complex tasks (desktop publishing, large documents with graphics, extremely large spreadsheets with complex cascading calculations, etc.)

8. AVAILABILITY: This is a measure of the readiness of the system and an application to deliver an expected service to the User with a required performance level. It may be described as a percentage of time that a system and an application are running as distinguished from the system being down for maintenance or repairs.

9. AVAILABILITY GOAL: This is the target service level as defined by the client for the server farm. This data value is input to the tool as a percentage of time that the client expects the systems and applications in the server farm to be accessible by all Users.

10. AVAILABILITY TAB WINDOW (FIGS. 24A,B OF U.S. Ser. No. 09/813,667: This shows the Availability Calculator which helps to determine solutions that include future/growth potential requirements with a variety of redundancy levels. This screen is interactive and will take input for Adjusted Concurrent number of users, system repair times and redundancy levels. This screen is interactive and will take input for Adjusted Concurrent number of users, system repair times and redundancy levels and returns solution information such as estimated number of servers, # peak users, availability, estimated downtime, # redundant servers and server farm mean time to failure (MTTF).

11. BACKGROUND PROCESSING: The ability of a user-interactive software application to execute processing steps independent of the input and output actions. Background processing would include, but is not limited to, procedures such as 'always on' spell checking in a word processor or 'always on' calculations in a spreadsheet.

12. BENCHMARK: This is test of computer performance and consists of a test or set of tests used to measure the performance of an individual e-Action ES Terminal Server. The output from these tests consists of a value designated as the total number of Users that each e-Action ES Terminal Server system can reasonably sustain and process.

13. BASE SOLUTIONS TAB WINDOW (FIG. 23 OF U.S. Ser. No. 09/813,667: Reports the minimum server configuration recommendation (i.e., not including additional redundancy or growth considerations) for each of the customer Site's server farms. A base solution includes the minimum number of servers and GB RAM required with regard to the Operating system, # processors and MHz available for each server type supported by Unisys.

14. CITRIX METAFRAME: This is computer software from Citrix Systems, Inc., headquartered in Ft. Lauderdale, Fla. This METAFRAME software is loaded onto each Windows Terminal Server and provides superior enterprise-level management and control functions for the e-@ction Enterprise Servers.

15. CITRIX METAFRAME ADD-ONS: ICA Secure and Load Balancing Services are two optional computer softwares that can be run simultaneously with CITRIX METAFRAME on a Terminal Server. ICA Secure provides enhanced network security for METAFRAME. Load Balancing Services allow Citrix MetaFrame to distribute application processing to the plurality of computer systems in a server farm.

16. CONCURRENT USERS: This number is an estimate of the maximum number of users simultaneously processing applications on a Server Farm at any given time. This is characteristically a percentage of the total Benchmark users that can be sustained on all of the e-@ction Enterprise Servers in the Server Farm.

17. CONFIGURATION DATABASE TEMPLATE: This is a collection of data on a computer applied during the information collection process and utilized for the assembly of information collected from window screens.

18. CONFIGURATION SESSION: This is the vehicle used by the described Thin Client Sizer Tool to collect the information on a customer's sizing requirements and to generate the best solution to meet those requirements.

19. CONFIGURATION SESSION DATABASE: This is a collection of data on a computer used for providing information to an instance of the Application Delivery Solution Configurator that enables algorithmic steps and calculations to be applied in the development of an optimized configuration for the Server Farm.

20. CONFIGURATOR: See APPLICATION DELIVERY SOLUTION CONFIGURATOR.

21. CUSTOMER DATA TAB WINDOW (FIG. 22 OF U.S. Ser. No. 09/813,667: Reports back to the customer the information that was collected during the interview session and that which the solution generation was based on.

22. CUSTOMER PROFILE: This is a collection of data describing the customer's characteristics and attributes and assembled from the customer interview. This data is input to an algorithm which will output a configuration solution for that particular User or customer.

23. DEFAULT AVAILABILITY: The four (4) SERVER FARM initial availability level scenarios as calculated and displayed by the AVAILABILITY CALCULATOR. The availability levels for the Server Farm are calculated based on the following three parameters: (1) the number of adjusted concurrent users, (2) the system repair time, and (3) the REDUNDANCY FACTOR. For the four DEFAULT AVAILABILITY levels, the first parameter is calculated based on the sizing of the SERVER FARM, and the latter two parameters have pre-configured values, as chosen by the Engineering Group, where the second parameter is held constant at 6 hours and the second parameter is varied from 25% to 10% in decrements of 5%.

24. DISK CAPACITY TAB WINDOW (FIG. 27 OF U.S. Ser. No. 09/813,667: Reports on the disk capacity requirements determined by the interview session input and solution generation algorithms for each of the customer Site's Server Farms.

25. DOWNTIME: The downtime or repair time for a single application server is the time interval required to restore the server and system back to normal business operation. At the end of the repair period, the applications running on the repaired server are available to Users. The downtime for a Server Farm is the time interval required to restore the nominal Server Farm performance.

26. e-@CTION ENTERPRISE SERVER (ES): This is the specific name for a plurality of server models marketed and sold by Unisys Corporation. Current models include ES7000, ES5000, and ES2000 systems.

27. ESTIMATOR PROGRAM: This is a program which performs method steps for estimating system parameters such as the availability of an application program to run on any computer or server in the cluster of at least two servers or computers. This type of estimator program was the subject of U.S. Pat. No. 6,334,196 which is incorporated herein by reference. Another estimator program is the subject of this patent application.

28. ETO: This represents engineering technology optimization and involves an organization located at a specific company location that is devoted to optimizing the performance of the Enterprise-class Windows NT Server platforms.

29. FAILOVER: This is a mode of operation in the system which has two or more servers or computers wherein a failure in one of the servers or computers will result in transfer of operations to the other or another one of the still operating servers and computers. Failover time is the period of time required for successful transfer from a failed server to an operative server.

30. INPUT CHARACTERISTICS: These attributes describe how input is provided to the customer's software applications—through textural typing, through GUI based screen manipulation, or through a combination of both methods.

31. KBPS REQUIREMENTS (SERVER FARM): This is the total data transmission capacity (or bandwidth), measured in kilobytes per second (Kbps), which will be needed for all bi-directional communication between the Users' concurrent connections and the SERVER FARM(s).

32. MB (MEGABYTE): A unit of computer memory or disk storage space equal to 1,048,576 bytes.

33. MEAN TIME TO FAILURE (MTTF): This is the average operating time between two failures, that can be estimated as the total operating time divided by the number of failures.

34. MEAN TIME TO REPAIR (MTTR): This is the average "downtime" in case of failure, that can be estimated as the total downtime divided by the number of failures.

35. MEMORY REQUIREMENTS: This is the necessary amount of server memory used by each User's instance of the multi-user software application.

36. NETWORK CAPACITY TAB WINDOW (FIG. 26 OF U.S. Ser. No. 09/813,667: This is called Network Utilization now; reports on the estimated network activity measured in Kbps for each of the customer Site's Server Farms.

37. OUTPUT CHARACTERISTICS: These attributes describe how output is derived from the customer's software applications—through the display of visual information as text, as graphics, as animated graphics, or as a combination of one or more methods.

38. OPTIMIZATION CRITERION: This is a function that determines the value of one of the essential system attributes and must be minimized (or maximized) by variation of one or more system parameters that are chosen as OPTIMIZATION PARAMETERS. Each optimization parameter should have a predefined domain that defines the values that the optimization parameter may assume. The OPTIMIZATION CRITERION is a focus of an optimum system design or configuration. The examples of the optimization criteria are system performance, system availability, and cost of ownership.

39. OPTIONAL SOFTWARE TAB WINDOW (FIG. 25 OF U.S. Ser. No. 09/813,667: Reports on the additional features/capabilities entered in the interview session regarding the customer's profile for each of the Site's Server Farms. Optional software requirements include such categories as Client Connection Methods, Enhancements, Environment support, Multimedia capabilities, Display characteristics, Protocol support, and Server Enhancements.

40. PROCESSING CHARACTERISTIC: This attribute describes whether the customer's software application performs extensive BACKGROUND PROCESSING, independent from the processing of application input and output.

41. REDUNDANCY FACTOR (Rf): This is a measure of the additional number of Users that can be added to the nominal number of Users per server without exceeding the maximum number of Users per server (server performance benchmark maximum of Users). It is a difference between maximum and nominal performance as a percentage of the maximum performance. The Redundancy Factor can be calculated as 100 percent minus a usage factor Uf.

42. SERVER CONFIGURATION REPORT: This is a report generated by the Thin Client Sizer Tool that will contain the information on the optimum server configurations as determined by the customer information which was collected during the Configuration Session and the performance benchmarking results.

43. SERVER FARM: This is one of the five main interview categories used by the Thin Client Sizer Tool for collecting customer information. A Server Farm consists of one or more Windows Terminal Servers configured together for unified administration, security, and for communication services. For instance, two Server Farms might be required for certain applications such as the PeopleSoft clients, or one server for a Payroll function, and another server for a Human Resources function.

44. SERVER FARM AVAILABILITY CALCULATOR: This is an estimator program that estimates the availability for the Server Farm.
45. SERVER FARM OVERFLOW: The condition whereby the results of calculations on the number of servers in a SERVER FARM, during the Solution Generation phase, exceeds the maximum number of servers recommended for a SERVER FARM as determined by the Engineering Group.
46. SERVER INFORMATION DATABASE: This is a collection of data on a computer for holding benchmark and informational data on a plurality of Unisys Enterprise Server systems. This data is used by the Thin Client Sizing Tool in determining the optimum server farm configuration to meet the customer's sizing requirements.
47. SITE: This is one of the five main interview categories used by the Thin Client Sizer Tool for collecting customer information. A Site is the physical location where the Windows Terminal Servers will be located in particular cities such as, New York, Los Angeles or Chicago, etc. and the number of users at that physical location.
48. SITE/SERVER FARM PAIR: This is a defined combination of a specific Server Farm residing within a particular physical location. As defined during the customer interview, each physical location, or site, can contain one of more Server Farms. When defining the User and Application characteristics of each Server Farm within the site, each individual combination is considered as an independent pair.
49. SIZING DATABASE: This is a collection of data on a computer output from the THIN CLIENT SEVER FARM AVAILABILITY CALCULATOR and used for storing the number of e-@ction Enterprise Server unit modules and their availability levels.
50. SOLUTION CONFIGURATOR: See APPLICATION DELIVERY SOLUTION CONFIGURATOR.
51. SOLUTION GENERATION: The act of producing a particular SERVER FARM configuration (i.e. the SOLUTION) that will meet the sizing and availability requirements of a client. This SOLUTION will be comprised of an appropriate number of servers, proper disk space and memory to meet the client requirements.
52. THIN CLIENT SERVER FARM AVAILABILITY CALCULATOR: This is one of the examples of the SERVER FARM AVAILABILITY CALCULATOR. Because Thin Client configurations are intended to make applications available to multiple Users at the same time, this calculator calculates the availability of a specified number of instances of an application (not just a single instance) where each application instance is being run at the server, but all the User input response is taking place at the client terminal. In this scenario, downtime occurs whenever the number of available instances of the application drops below the required specified number of instances.
53. UCON32: This is the unit designated as the Unisys Configurator which is an extensive on-line configuration tool which is used to support all Unisys Corporation system platforms.
54. USAGE FACTOR (Uf): This is the ratio of the nominal number of Users per server to the maximum number of Users per server (server performance benchmark maximum of Users) times 100 percent.
55. USER-TYPE: This is one of the five main interview categories used by the Thin Client Sizer Tool for collecting customer information. A User-Type embodies the usage patterns of a particular group of Users. User usage patterns will have a significant impact on performance. The area which is considered here is the user's typing speed. Some examples of User-types are, order entry clerks, secretaries, developers, and technical writers.
56. USER WEIGHT: This is the estimated average user impact (light, medium, heavy or super heavy) on the Windows Terminal Server, and a value is assigned to each User Type by the sizing tool. Such User attributes as typing speed or application familiarity can all affect this parameter. It is used to approximate the amount of server processor usage that is imposed by the different User Types.
57. WINDOWS TERMINAL SERVER: This is the designation for an e-@ction Enterprise Server that is running one of two operating systems sold and supported by Microsoft Corporation: (1) Windows NT Server 4.0, Terminal Server Edition, or (2) Windows 2000 (Server, Advanced Server, or Datacenter Server) with the optional Terminal Services service enabled in Application Server mode.

DESCRIPTION OF PREFERRED EMBODIMENT

Figure 3:
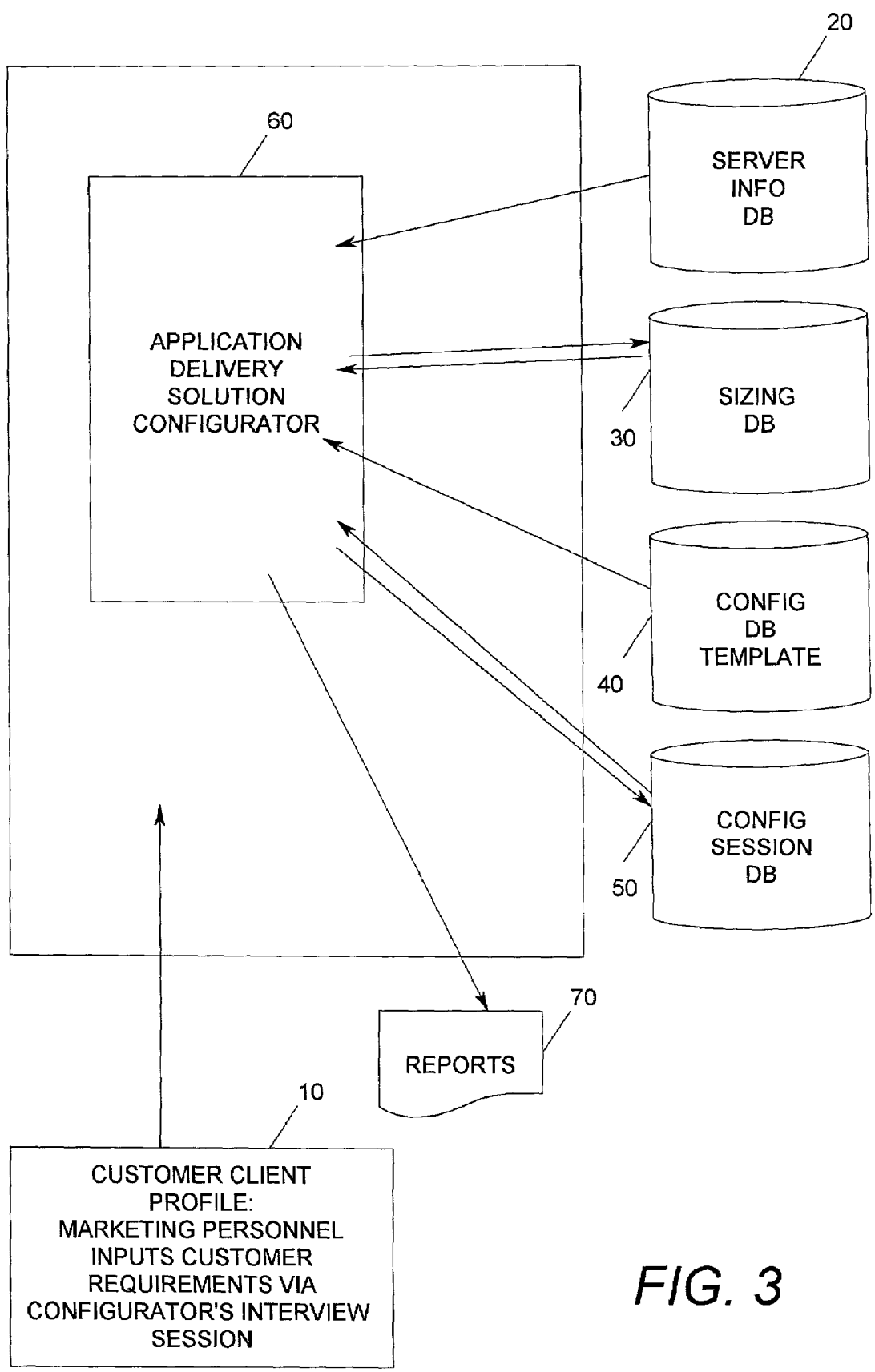
FIG. 3 is an overall environmental drawing showing the basic modules and elements involved in a particular enterprise solution.

FIG. 3 is an overall environmental drawing of a Thin Client Solution Configurator method which indicates the various elements involved in providing and optimizing Enterprise server solutions for a customer's enterprise.

As seen in FIG. 3, the Application Delivery Solution Configurator program algorithm 60 has a series of input and output connections which include an input from the Customer Client Profile 10, plus inputs from the Server Information Database 20, the Sizing Database 30, the Configuration Database Template 40, and the Configuration Session Database 50. Additionally, the algorithm of the Application Delivery Solution Configurator 60 also provides information for storage in the Sizing Database 30 and the Configuration Session Database 50, after which a final series of information and reports can be provided at the Reports Module 70.

The Application Delivery Solution Configurator program 60 has a number of areas which must be fulfilled and satisfied in order to provide the final report. One of these areas which must be calculated and provided to the Solution Configurator 60 is that of the present invention which involves the method for calculating user weights. The weights are designated as: light, medium, heavy or super-heavy.

Figure 2A:
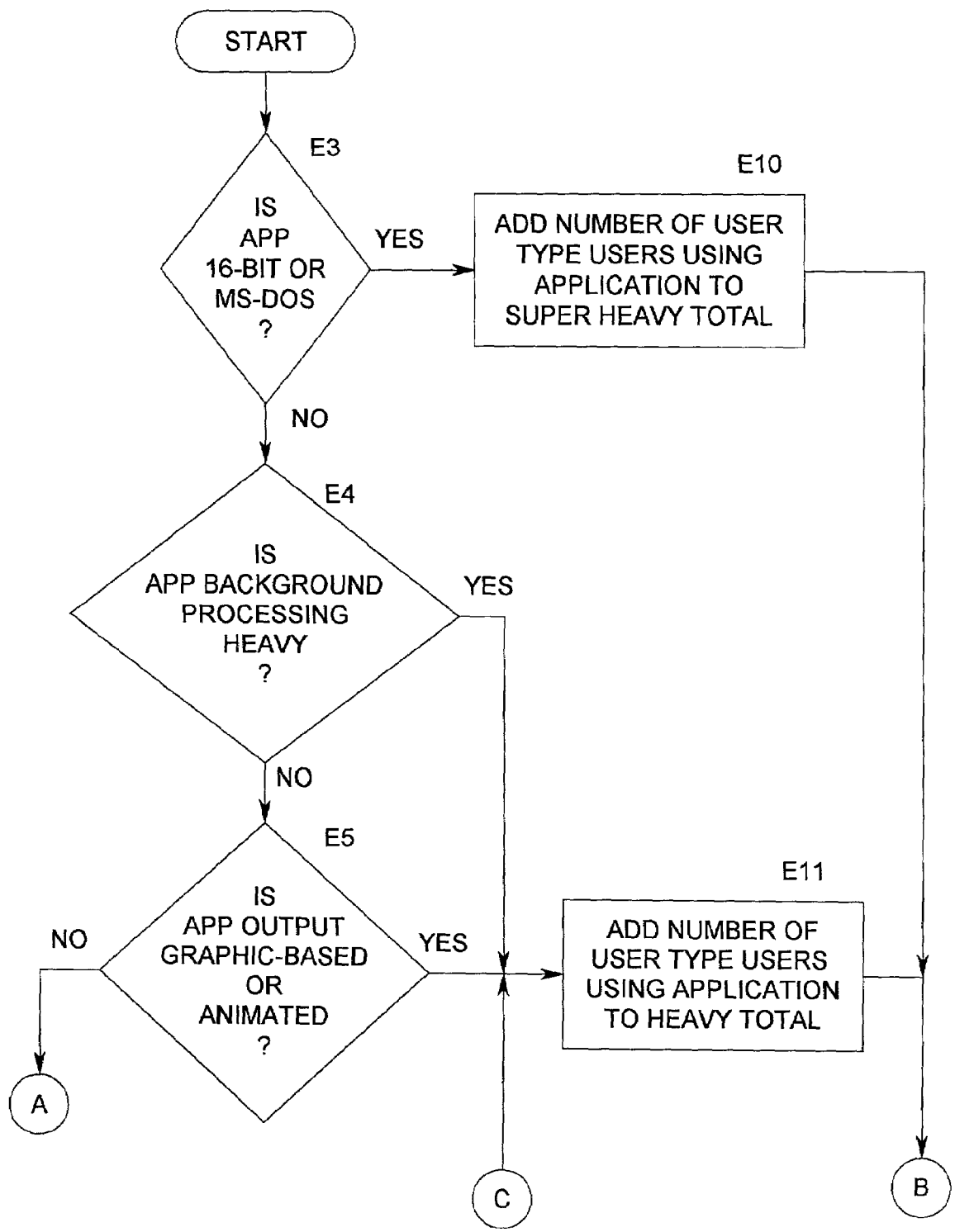
Figure 2B:
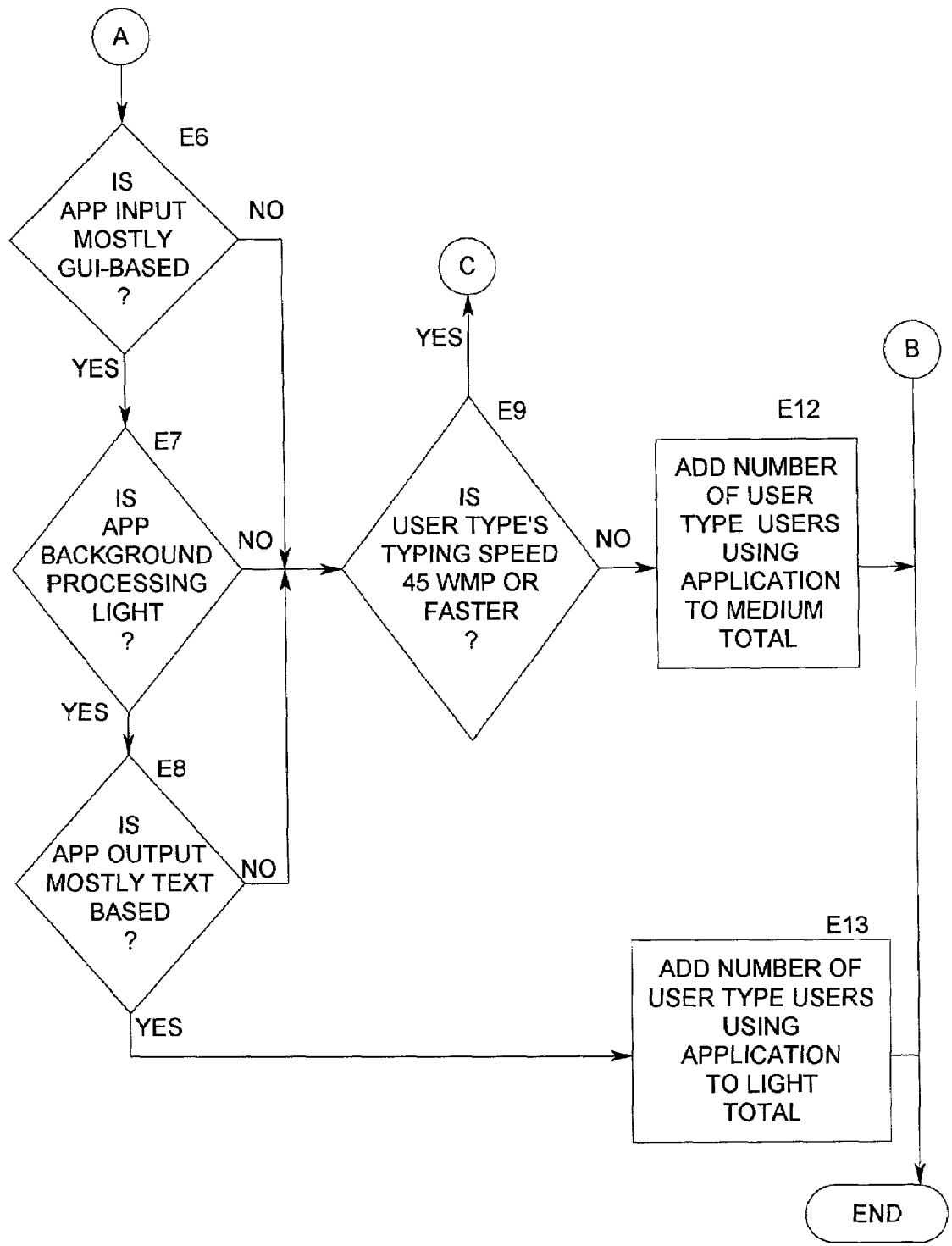

Here, FIGS. 1 and 2 will illustrate a flowchart which shows the various steps involved in order to calculate the user weights information involved which can then be input to the Application Delivery Solution Configurator 60 at the appropriate steps in order to help generate the final configurator solution.

FIGS. 1 and 2, as shown, will be described hereinbelow as a series of steps designated E1, E2, E3 . . . E16. Additionally, during the description of the flowchart steps involved, there will be given certain numbers and application information in a specific example to better illustrate exactly how the particular algorithm can be effectuated. These numbers are for illustrative purposes only and will vary depending on the customer profile and the type of results desired by a given customer-user or enterprise developer.

Referring to FIGS. 1 and 2, and using a simple example, the customer's profile for a single Server Farm could look like the following:

I. Server Farm: Engineering (650 concurrent users)
   300 Developers use a terminal emulator from Attachmate
   200 Developers use Microsoft Internet Explorer
   100 Developers use Microsoft Access 97
   50 Developers use IOCooker
IA: User Type attributes:
   Developers—insignificant average typing speed
IAA: Application attributes:
   (i) Attachmate terminal emulators—32-bit application with GUI-based input, text-based output and "Light" background processing.
   (ii) Internet Explorer—32-bit application with text-based I/O and "Medium" background processing.
   (iii) Access 97—32-bit application with mostly GUI-based input, text-based output and "Heavy" background processing.
   (iv) IoCooker—16-bit application with text-based I/O and "Super-Heavy" background processing.

The sequence begins in FIG. 1 with the User-Types assigned to a particular Server Farm within a Site E1. In the above example, the only "User Type" assigned to the Engineering Server Farm (I) is that of Developers. Each Application used concurrently by the 650 Developers is then considered at step E2, beginning with the Attachmate terminal emulator (i), which is used by 300 Developers.

Step E2a of FIG. 1 then refers to steps E3–E13 which are shown in FIG. 2.

The first decision block E3 of FIG. 2 asks whether the Attachment terminal emulator is either a 16-bit or MS-DOS application to which the initial answer here is "NO". With the "NO" answer, the next decision block step E4 asks whether Attachmate terminal emulator's background processing is Heavy to which here the initial answer is "NO". With the "NO" answer, the next decision block at step E5 asks whether the Attachmate terminal emulator's output is graphic-based or animated to which the initial answer is "NO". With the "NO" answer, the next decision block, step E6 asks whether the Attachmate terminal emulator's input is mostly GUI-based—to which the initial answer is "YES". With the "YES" answer, the next decision block step E7 asks whether the Attachmate terminal emulator's background processing is light to which the initial answer is "YES". With the "YES" answer, the next decision block step E8 asks whether Attachmate terminal emulator's output is mostly text-based to which the initial answer here is "YES".

At this point, the number of Developer User Types concurrently running the Attachmate terminal emulator application (300) is added to a category called the Light User Total at step E13. Thus, at this point there are 300 "light users" for the Server Farm. The next step sequence step E14 in FIG. 1 then asks if there are "More Applications?" involved, which for this example, is answered "YES" (since there are other applications in the Server Farm such as Internet Explorer, Access 97 and I/O Cooker) and the flow sequence returns to step E2.

The next application considered for the Developers User Type is the Internet Explorer application (ii) at step E2, FIG. 1. The decision block step E3 on FIG. 2 asks whether the Internet Explorer is either a 16-bit or MS-DOS application E3, to which the answer here is "NO". With the "NO" answer, the next decision block step E4 asks whether Internet Explorer's background processing is Heavy to which the answer is "NO" since it is "light". With the "NO" answer, the next decision block, step E5 asks whether the Internet Explorer's output is graphic-based or animated E5 to which the answer is "NO". With the "NO" answer, the next decision block step E6 asks whether Internet Explorer's input is mostly GUI-based to which the answer here is "NO" (since it is "text based").

With the "NO" answer, the next decision block is step E9 which asks whether the Developer's typing speed is 45 wpm or faster to which the answer is here "NO". At this point, the number of Developers User Type concurrently running the Internet Explorer application (200 Developers) is added to the "Medium User" Total at step E12. The sequence block step (E14 of FIG. 1) is then asked if there are "More Applications?" involved, which, in this example, is answered "YES" (since there are still Access 97 and I/O Cooker applications) and then the flow sequence returns back to step E2 on FIG. 1.

At step E2, the next application considered for the Developers User Type is the "Access 97" application (iii). The decision block step (E3, FIG. 2), asks whether Access 97 is either a 16-bit or MS-DOS application E3 to which the answer here is "NO" since Access 97 has a GUI-based input. With the "NO" answer, the next decision block, step E4 asks whether Access 97's background processing is Heavy E4 to which the answer is here "YES". At this point, the number of Developers User Types concurrently running the Access 97 application (100 Developers) is added at step E11 to the Heavy User Category Total.

At this state, the sequence block step E14, FIG. 1, is then asked if there are "More Applications?" involved, which, in this example, is answered "YES" (since the IoCooker application (iv) is still in play) and then the flow returns to step E2, to handle the next application.

The last application considered at step E2 for the Developers User Type is IOCooker (iv). The decision block step E3, FIG. 2, asks whether IOCooker is either a 16-bit or MS-DOS application E3 to which the answer is "YES" (16-bit) since this is a 16-bit application. At this point, the number of Developer Users Types concurrently running the IOCooker application (50 Developers) is added to the "Super Heavy User" Category Total at step E10, FIG. 2.

The involvement of "More Applications?" is asked again at sequence block step (E14, FIG. 1), and this is answered "NO" here, (since all of the four applications (i, ii, iii, iv) have now been handled) after which the flow sequence dictates that the step E15 question "More User Types?" is asked E15 and is answered "NO", since only one User Type was defined and has been handled. The sequence flow then continues by returning the total number of Super Heavy, Heavy, Medium and Light User Totals for the Server Farm at step E16 to the Solution Generation flow (as was indicated in the application U.S. Ser. No. 09/813,670 as output from D13 in FIG. 1B, of U.S. Ser. No. 09/813,670.

For the Engineering Server Farm example, the user weighting algorithm then finalizes the results and returns the following information:
   300 Light Users
   200 Medium Users
   100 Heavy Users
   50 Super Heavy Users These results can then be input into step D13 of FIG. 1B, of U.S. Ser. No. 09/813,670 and used to calculate the Adjusted Users Total by utilizing this information on User-weights to help complete the Solution Generation.

Described herein has been a method and system for developing the User-weight category data for each application involved in each Server Farm together with the number of Users involved with each User-weight category. This data can then be supplied to a Thin Client Sizing Tool at the appropriate data input section of the Application Solution Delivery Configurator to enable an optimal configuration proposal suitable to a given customer's profile applicable to the customer-enterprise.

The resulting user weights can then be applied to the customer's configuration solution so that the number of users within the Server Farm can be better estimated with regard to the amount of processing they will incur. These weights will be applied so that a typical analysis would portray a user weight as a percentage of a typical benchmark user. For example, a user weighted as Super Heavy could be 200% of a benchmark user, a Heavy user could be 100% (i.e., Heavy use IS typical of a benchmark user), a Medium user could be 67% and a Light user 50%. When systematically applied to the number of users within the example Server Farm, the 650 original users becomes 892 adjusted users using the followed calculation:

(# Super Heavy users * 200%)+
(# Heavy users * 100%)+
(# Medium users * 67%)+
(# Light users * 50%)=
(300 * 2)+(200 * 1)+(100 * 0.67)+(50 * 0.5)=600+200+67+25=892 adjusted users.

While one preferred embodiment of the invention has been described, other variations and embodiments may be realized which are still encompassed by the following claims.

What is claimed is:

1. In a Thin Client Sizing Tool for configuring an Optimal Server Farm for a customer-enterprise, wherein client-customer profile data is developed from a client-customer as input to a Solution Configurator algorithm for developing an optimized solution for a network of one or more Server Farms and associated modules most suitable for said client-customer needs, a method for utilizing said client-customer profile data to specific User-weight categories for each User-Type involved with each specific Application in each said Server Farm, wherein concurrent Users who are processing applications on each Server Farm are categorized as to the type of User and the usage weight of the User such that a User weight value is assigned to each User in each application, said User weight being categorized as Light User, Medium User, Heavy User, said method comprising the steps of:

(a) sorting-out and eliminating those Applications which are 16-bit or MS-DOS;
wherein step (a) includes the step of:
(a1) selecting those Applications whose background processing involves Heavy Users;
(a2) adding the number of Users using each Application as a Heavy User;
(a3) accumulating the total number of User-Type "Heavy" Users utilizing each and every Application and applying a 100% weight factor for each of said Heavy Users for input to said Solution Configuration algorithm;
(b) sorting-out and eliminating those Applications which involve Heavy Users in processing;
wherein step (b) includes the steps of:
(b1) selecting those Applications whose output is NOT graphics-based or animated;
(b2) selecting those Applications whose input is NOT mostly GUI-based;
(b3) selecting those User-Types whose typing speed is slower than 45 words/minute;
wherein step (b3) includes the steps of:
(b3a) selecting those Applications whose input is faster than 45 words/minute;
(b3b) adding the number of such User-Type Users to the Heavy User total; and applying a 100% weight factor to said Heavy User total;
(b3c) accumulating the total number of Users of the Heavy category for each and every one of the Applications used in each Server Farm;
(b4) adding-up the number of User-Type Users utilizing said Applications as a "Medium" User;
(b5) accumulating the total number of Medium Users and applying a weight factor of 67% value for each said Medium User category for input to said Solution Configuration algorithm;
(c) sorting-out and eliminating those Applications which are graphic-based or animated;
(d) selecting those Applications having an input which is mostly GUI-based;
(e) selecting those Applications whose background processing involves Light Users;
wherein step (e) includes the steps of:
(e1) selecting those Applications which are NOT mostly text-based;
(e2) selecting those User-types whose typing speed is faster than 45 words/minute;
(e3) adding the number of User-type Users to the "Heavy" category and utilizing a 100% weight factor value to the number of Heavy User-type Users;
(e4) accumulating the total number of Heavy Users for each and every one of the Applications used in each Server Farm for input to said Solution Configuration algorithm;
(f) selecting those Applications whose output is mostly text-based;
(g) adding up the number of Light Users for each Application type;
(h) accumulating the total number of User-Type Users using Applications involving a "Light" User;
(i) utilizing a weight factor of 50% to establish a weight factor value for said Light users;
(j) inputting said Light User weight factor value to said Solution Configurator algorithm for said total number of Light Users in each server Farm.

2. The method of claim 1 wherein step (e1) includes the steps of:
(e1a) selecting those User-Types whose typing speed is slower than 45 words/minute;
(e1b) adding the number of Medium Users using each Application and assigning a 67% weight factor value to said Medium Users;
(e1c) accumulating the total number of Medium Users for each and every one of the Applications used in each Server Farm;
(e1d) inputting the total number of Medium Users and said 67% weight factor value to said Solution Configuration algorithm.

* * * * *